US012725956B2

(12) United States Patent
Ilie

(10) Patent No.: US 12,725,956 B2
(45) Date of Patent: Sep. 1, 2026

(54) ELECTRICAL CONNECTOR COMPRISING TWO PLURALITIES OF FLEXIBLE STRIPS, ONE SURROUNDING THE OTHER IN AN INSERTED CONFIGURATION OF THE CONNECTOR

(71) Applicant: ULTRATECH, Le Chesnay (FR)

(72) Inventor: Razvan Ilie, Rocquencourt (FR)

(73) Assignee: ULTRATECH, Le Chesnay (FR)

( * ) Notice: Subject to any disclaimer, the term of this patent is extended or adjusted under 35 U.S.C. 154(b) by 347 days.

(21) Appl. No.: 18/479,467

(22) Filed: Oct. 2, 2023

(65) Prior Publication Data

US 2024/0113461 A1 Apr. 4, 2024

(30) Foreign Application Priority Data

Oct. 3, 2022 (FR) ..................................... 22 10084

(51) Int. Cl.
*H01R 13/11* (2006.01)

(52) U.S. Cl.
CPC ................................. *H01R 13/111* (2013.01)

(58) Field of Classification Search
None
See application file for complete search history.

(56) References Cited

U.S. PATENT DOCUMENTS 9,425,548 B2 8/2016 Van Swearingen
10,348,037 B2 * 7/2019 Ilie .................... H01R 13/2457
10,840,646 B2 * 11/2020 Zhang .................... H01R 24/40
11,158,984 B2 * 10/2021 Graßl .................... H01R 13/111
11,923,633 B2 * 3/2024 Stevens .................. H01R 13/05
2017/0244196 A1 8/2017 Ilie
2024/0332843 A1 * 10/2024 Wang .................... H01R 13/03

FOREIGN PATENT DOCUMENTS

CN 113131253 7/2021

OTHER PUBLICATIONS

Preliminary Search Report dated May 2, 2023 in FR 22 10084.
Search Report dated Jan. 24, 2024 in EP 23 20 1438.

* cited by examiner

*Primary Examiner* — Ross N Gushi
(74) *Attorney, Agent, or Firm* — B. Aaron Schulman, Esq.; Stites & Harbison, PLLC

(57) ABSTRACT

An electrical connector (10) comprising a first contact (12) and a second contact (14) movable between a non-inserted configuration and an inserted configuration, wherein an insertable part (16) is inserted along an axis of insertion (D) into a housing (18) defined by a first plurality of lamellae (40) of the second contact.

Figure 1:
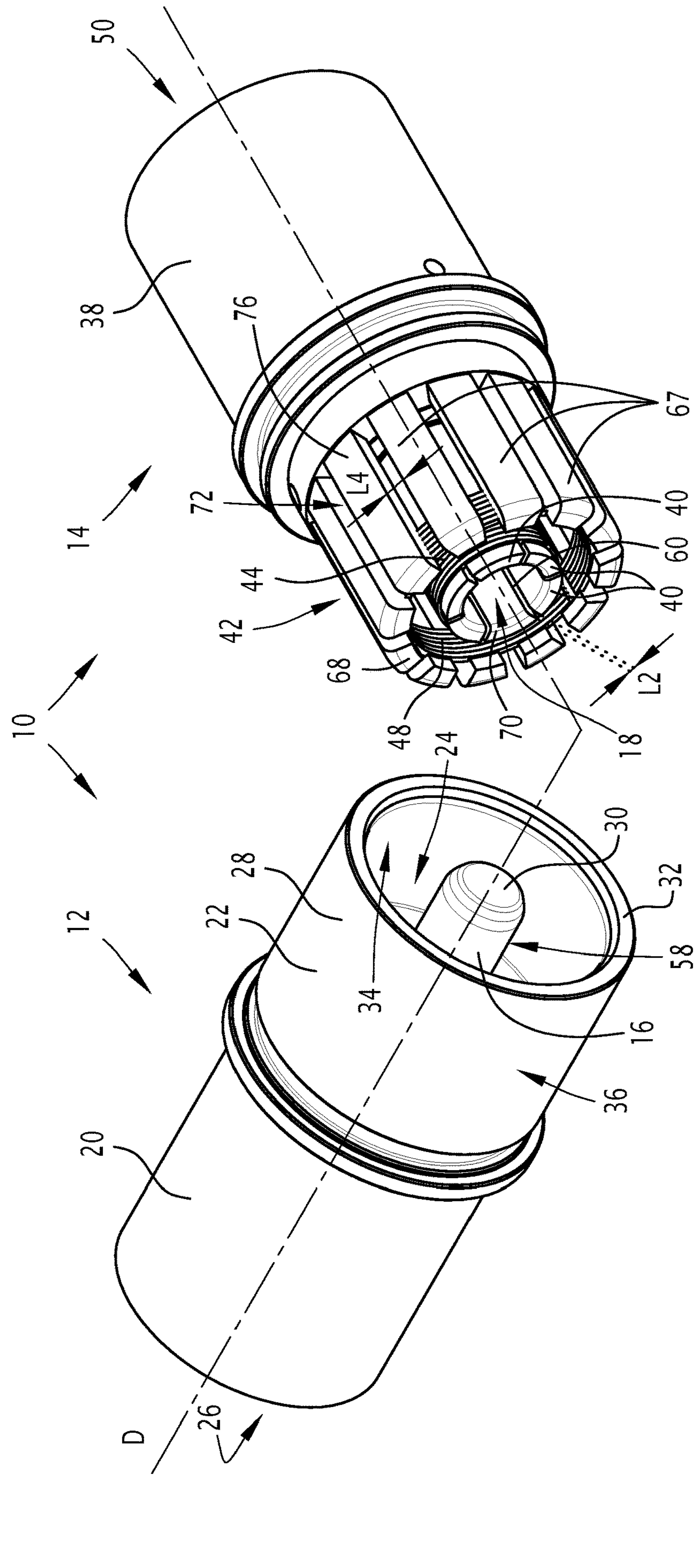

The first contact comprises a first additional part (22) surrounding the insertable part about the axis of insertion and comprising one amongst a ring (28) and a second plurality of lamellae (67). The second contact comprises a second additional part (42) surrounding the first plurality of lamellae about the axis of insertion and comprising the other among the ring and the second plurality of lamellae, the first additional part and the second additional part being suitable for being radially pressed against each other in the inserted configuration.

11 Claims, 4 Drawing Sheets

ELECTRICAL CONNECTOR COMPRISING TWO PLURALITIES OF FLEXIBLE STRIPS, ONE SURROUNDING THE OTHER IN AN INSERTED CONFIGURATION OF THE CONNECTOR

BACKGROUND

Field of the Disclosure

The present disclosure deals with an electrical connector having a first contact and a second contact movable between a non-inserted configuration, wherein the first contact is at a distance from the second contact, and an inserted configuration, wherein an electrically conductive insertable part of the first contact is inserted along an axis of insertion into a housing defined by the second contact.

An electrical connector is e.g. a power connector, i.e. same is suitable for transmitting a current with an value greater than or equal to 1 A.

Description of Related Art

Two categories of such electrical connectors are currently known. A first category encompasses connectors having an interface intended for providing a good contact surface. The interface is usually produced using wires or a deep-drawn plate, in order to obtain the correct shape. Such category has the advantage of requiring low insertion forces and having a good resistance to vibrations. However, the number of parts used to make the interface is relatively high, and the space occupied by the interface creates congestion. Furthermore, such type of connector is relatively expensive.

In the second category, the electrical contact is ensured by the pressure of the two contacts, which has to be high, in order to compensate for a small contact surface. Such connectors have a lower manufacturing cost, but require high insertion forces and have a poorer resistance to vibrations and fretting, i.e. to contact wear which affects the surfaces in contact with the first contact and with the second contact.

In order to improve the quality of such type of electrical connector, it has been proposed that the second contact includes a plurality of flexible lamellae surrounding the insertable part of the first contact, one or a plurality of annular compression members being sometimes used for increasing the pressure of the lamellae on the insertable part.

However, such connectors, although being satisfactory because same provide both a reasonable insertion force and a low electrical resistance, occupy a certain volume in the inserted configuration.

A goal of the disclosure is thus to provide an electrical connector always requiring a reasonable insertion force and having a low electrical resistance, and also a reduced bulk (volume) in the inserted configuration, while remaining easy to manufacture at a competitive cost.

BRIEF SUMMARY OF THE DISCLOSURE

To this end, the disclosure relates to an electrical connector comprising a first contact and a second contact movable between an non-inserted configuration, wherein the first contact is at a distance from the second contact, and an inserted configuration, wherein an electrically conductive insertable part of the first contact is inserted along an axis of insertion into a housing defined by the second contact, the first contact comprising a first electrically conductive body from which the insertable part protrudes axially, the second contact including a second electrically conductive body, and a first plurality of lamellae protruding axially from the second body and angularly distributed about the insertable part in the inserted configuration, the first plurality of lamellae being electrically conductive and radially flexible, the second body and the first plurality of lamellae defining the housing, wherein:

- the first contact further comprises an electrically conductive first additional part protruding axially from the first body and surrounding the insertable part about the axis of insertion,
- the second contact comprises an electrically conductive second additional part protruding axially from the second body and surrounding the first plurality of lamellae about the axis of insertion,
- the first additional part and the second additional part are suitable for being radially pressed against each other and for being in electrical contact with each other in the inserted configuration, and for being at a distance from each other in the non-inserted configuration, and
- the first additional part comprises one amongst a ring and a second plurality of lamellae, angularly distributed about the axis of insertion and radially flexible, the second additional part comprising the other amongst the ring and the second plurality of lamellae.

According to particular embodiments, the electrical connector has one or a plurality of the following features, taken individually or according to all technically possible combinations:

- the ring surrounds the second plurality of lamellae about the axis of insertion in the inserted configuration, the second plurality of lamellae being pressed radially against a radially inner surface of the ring;
- at least one annular pressure member arranged on faces of the second plurality of lamellae, the pressure member being suitable for exerting, in the inserted configuration, a radial pressure on the second plurality of lamellae toward the ring;
- the or each pressure member comprises a "C"-shape curved lamella;
- a plurality of annular pressure members axially shifted with respect to each other;
- at least one annular compression member arranged on radially outer faces of the first plurality of lamellae, the compression member being suitable for exerting, in the inserted configuration, a centripetal radial pressure on the first plurality of lamellae;
- the ring defines: a cylindrical, or frustoconical, radially inner surface flaring on the distal side along the axis of insertion; or a cylindrical, or frustoconical, radially outer surface narrowing on the distal side along the axis of insertion;
- the first body comprises a main part, and a base received axially in and attached to said main part, the insertion part being integral with said base;
- the second body comprises a main part, and a base received axially in and attached to said main part, the first plurality of lamellae being integral with said base;
- the second plurality of lamellae is integral with a base defined by the first body or the second body, said base being received axially in and attached to a main part of the first body or of the second body; and
- the connector is a power connector suitable for transmitting a current with a value greater than or equal to 1 ampere.

BRIEF DESCRIPTION OF THE SEVERAL VIEWS OF THE DRAWING(S)

Figure 2:
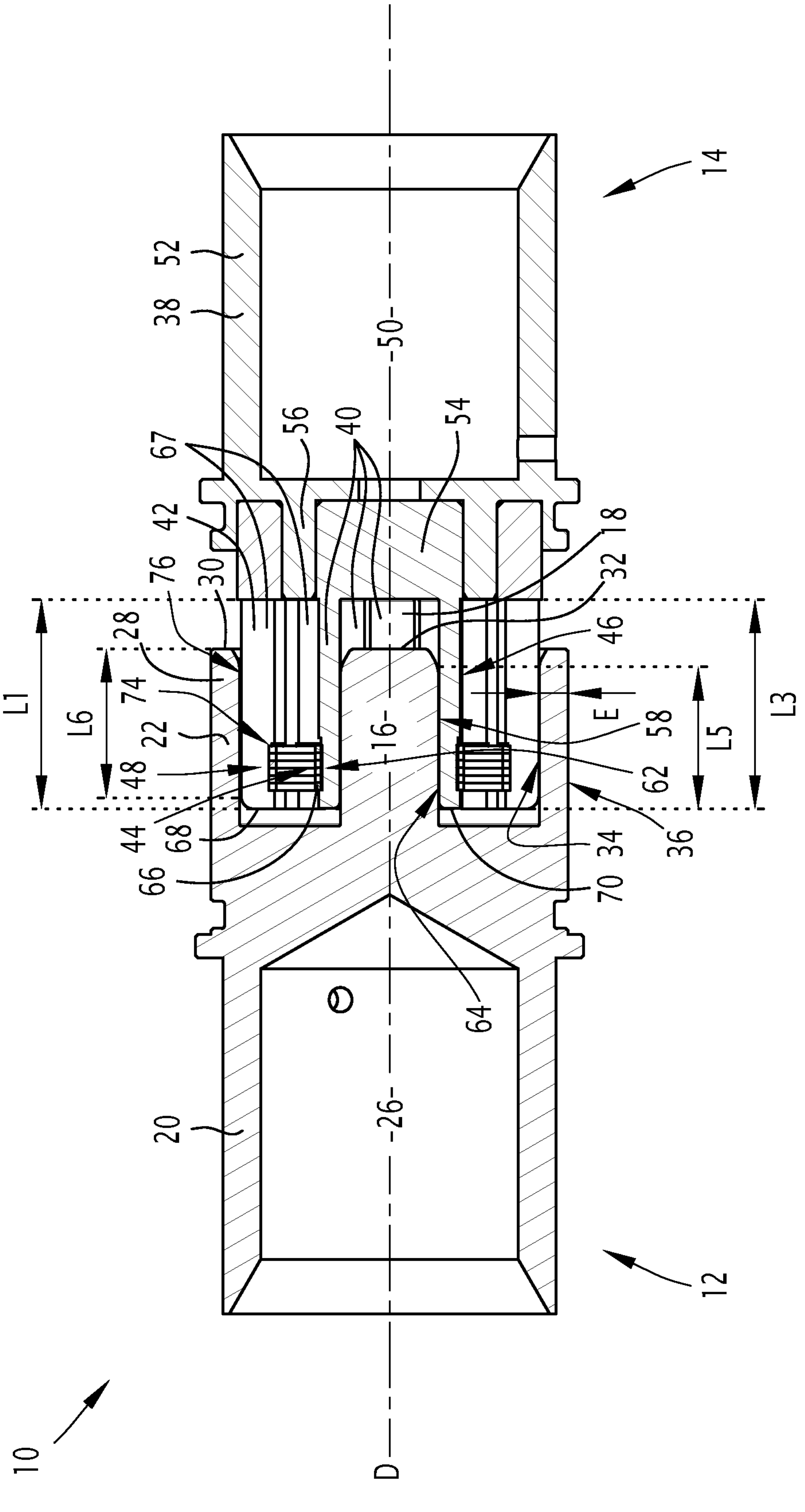
Figure 3:
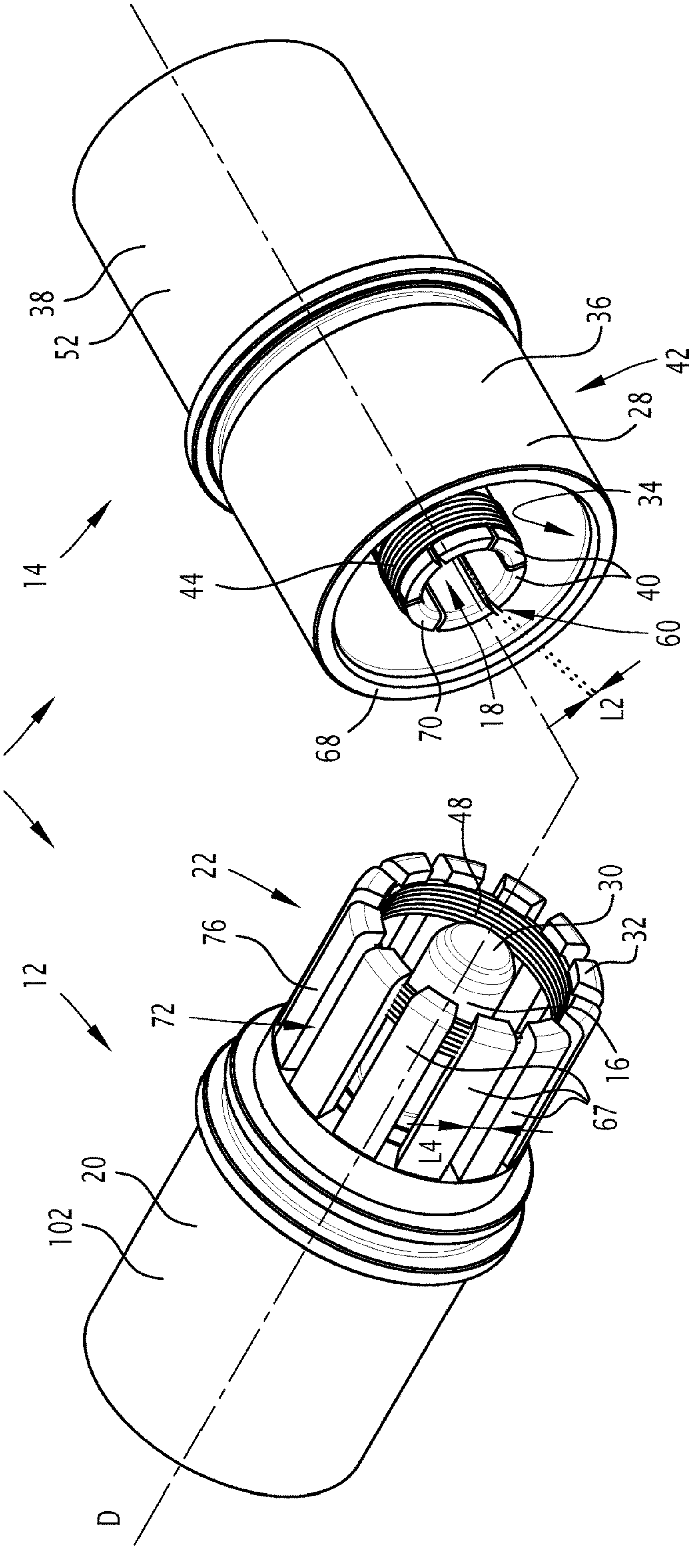
Figure 4:
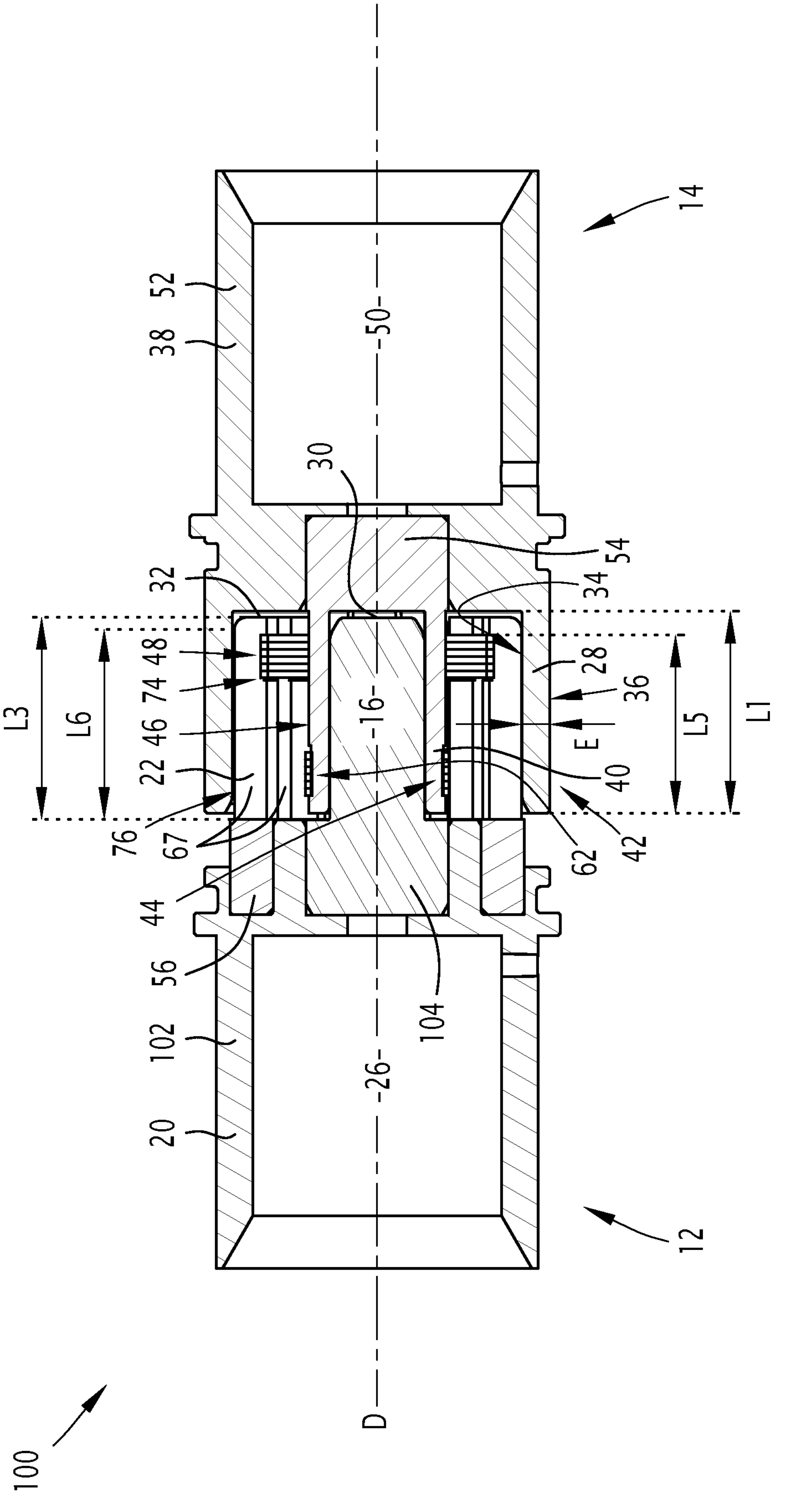

The disclosure will be better understood upon reading the following description, given only as an example and making reference to the enclosed drawings, wherein:

FIG. 1 is a perspective view in the non-inserted configuration, of an electrical connector according to the disclosure, FIG. 2 is a section view in a radial plane, in the inserted configuration, of the electrical connector shown in FIG. 1, FIG. 3 is a perspective view, in the non-inserted configuration, of an electrical connector according to the disclosure, the electrical connector being a variant of the electrical connector shown in FIGS. 1 and 2, and FIG. 4 is a section view in a radial plane, in the inserted configuration, of the electrical connector shown in FIG. 3.

DETAILED DESCRIPTION OF THE DISCLOSURE

With reference to FIGS. 1 and 2, an electrical connector 10 according to the disclosure, is described.

The electrical connector 10 comprises a first contact 12 and a second contact 14 movable between a non-inserted configuration (FIG. 1), wherein the first contact is at a distance from the second contact, and an inserted configuration (FIG. 2), wherein an electrically conductive insertable part 16 of the first contact is inserted along an axis of insertion D into a housing 18 defined by the second contact.

"Conductor", as defined by the present document, is a material the electrical resistivity of which at 300 K is e.g. less than or equal to $10^{-5}$ Ω·m. On the other hand, "insulator" refers to a material the electrical resistivity of which at 300 K is e.g. greater than or equal to $10^{-5}$ Ω·m.

The first contact 12 comprises a first electrically conductive body 20 from which the insertable part 16 protrudes axially, and a first electrically conductive additional part 22 protruding axially from the first body and surrounding the insertable part about the axis of insertion D.

In the example, the insertable part 16 and the first additional part 22 are integral with the first body 20.

Advantageously, the insertable part 16 and the first additional part 22 define radially therebetween, an annular space 24 suitable for receiving the second contact 14 in the inserted configuration. The insertable part 16 and the first additional part 22 are e.g. centered on the axis of insertion D.

On the proximal side, the first body 20 defines e.g. a housing 26 intended for receiving an electrical cable or a conductive part (not shown).

"Proximal" refers to, for each of the contacts, the side opposite the insertion along the axis of insertion D. Correlatively, "distal" refers to the side defined by the direction of insertion along the axis of insertion D.

The insertable part 16 is e.g. cylindrical and advantageously solid.

In the example, the first additional part 22 forms a ring 28. The first additional part 22 and the insertion part 16 have distal ends 30, 32, e.g. located substantially at the same level along the axis of insertion D.

The ring 28 advantageously defines a cylindrical radially inner surface 34 and e.g. a radially outer surface 36 which is also cylindrical. The ring 28 advantageously has a constant thickness E about the axis of insertion D.

According to a variant (not shown), the radially inner surface 34 is frustoconical flaring on the distal side along the axis of insertion D.

The second contact 14 comprises a second electrically conductive body 38 and a first plurality of lamellae 40 protruding axially from the second body 38 and angularly distributed, in the inserted configuration, around the insertable part 16. The second contact 14 comprises a second additional electrically conductive part 42 protruding axially from the second body 38 and surrounding the first plurality of lamellae 40 about the axis of insertion D.

In the example, the second contact 14 comprises a plurality of annular compression members 44 arranged on radially outer faces 46 of the first plurality of lamellae 40, the compression members being suitable for exerting, in the inserted configuration, a radial pressure, centripetal with respect to the axis of insertion D, on the first plurality of lamellae.

According to a variant (not shown), the second contact 14 comprises only one compression member 44.

The second contact 14 advantageously comprises a plurality of pressure members 48 or, according to a variant not shown, only one.

On the proximal side, the second body 38 defines e.g. a housing 50 intended for receiving an electrical cable or a conductive part (not shown).

The second body 38 advantageously comprises a main part 52, and two bases 54, 56 received in and attached to the main part on the proximal side of the bases, and with which the first plurality of lamellae 40 and the second additional part 42 are integral.

According to variants (not shown), one and/or the other of the two bases 54, 56 are integral with the main part 52 of the second body 38. In other words, the first plurality of lamellae 40 and/or the second additional part 42 are not directly mounted but are integral with the main part 52.

The lamellae of the first plurality 40 are electrically conductive and radially flexible, the second body 38 and the lamellae 40 defining the housing 18. The lamellae 40 are suitable for pressing against a radially outer surface 58 of the insertion part 16.

The lamellae 40 are advantageously identical to one another and distributed regularly about the axis of insertion D. Two angularly consecutive lamellae 40 are advantageously separated by a slot 60.

There are at least two lamellae 40. In the example shown, there are six lamellae 40.

According to variants (not shown), there are four, eight, ten or twelve lamellae 40.

The lamellae 40 advantageously define circumferential grooves 62 aligned with one another about the axis of insertion D and suitable for receiving the compression members 44.

In the non-inserted configuration, the slots 60 have e.g. a length 21, along the axis of insertion D, comprised between 5 mm and 40 mm, and a width 22, along the circumferential direction, comprised between 0.2 mm and 2.5 mm.

In the inserted configuration, the lamellae 40 have radially inner faces 64 pressed against the insertable part 16.

The compression members 44 are advantageously similar to one another, and are e.g. six. The compression members 44 are suitable for exerting, in the inserted configuration, a centripetal radial pressure on the first plurality of lamellae 40.

The compression members 44 are advantageously located axially on a distal third of the first plurality of lamellae 40.

Each of the compression members comprises e.g, a strip 66 curved about the axis of insertion D and having a "C" shape. Each of the compression members 44 advantageously forms an interrupted ring.

Each of the compression members 44 is advantageously made of a material having a coefficient of thermal expansion lower than the coefficient of thermal expansion of the lamellae 40 of the first plurality, and lower than the coefficient of thermal expansion of the insertable part 16.

The second additional part 42 and the first additional part 22 are suitable for being, in the inserted configuration, radially pressed against each other and in electrical contact with each other. In the non-inserted configuration, the second additional part 42 and the first additional part 22 are at a distance from each other.

In the example, the second additional part 42 consists of a second plurality of lamellae 67 which are distributed angularly about the axis of insertion D and radially flexible. The second additional part 42 and the first plurality of lamellae 40 have distal ends 68, 70, e.g. located substantially at the same level along the axis of insertion D.

The second plurality of lamellae 67 is e.g. surrounded by the ring 28 about the axis of insertion D in the inserted configuration, the second plurality of lamellae being pressed radially against the radially inner surface 34 of the ring.

In the example, the first plurality of lamellae 40 and the second plurality of lamellae 67 are suitable for being received in the annular space 24.

The lamellae of the second plurality 67 are advantageously identical to each other and distributed regularly about the axis of insertion D. Two angularly consecutive lamellae 67 are advantageously separated by a slot 72.

There are at least two, preferentially at least four, lamellae 67. In the example shown, there are twelve lamellae 67.

According to variants (not shown), there are six, eight, ten or more than twelve lamellae 67.

The lamellae 67 advantageously define circumferential grooves 74 aligned with one another about the axis of insertion D and suitable for receiving the pressure members 48.

In the non-inserted configuration, the slots 72 have e.g. a length 23, along the axis of insertion D, comprised between 5 mm and 40 mm, and a width 24, along the circumferential direction, comprised between 0.2 mm and 2.5 mm.

In the inserted configuration, the lamellae 67 have radially outer faces 76 pressed against the ring 28.

The pressure members 48 are advantageously similar to one another, and e.g. six in number. The pressure members 48 are suitable for exerting, in the inserted configuration, a centrifugal radial pressure on the second plurality of lamellae 67.

The pressure members 48 are e.g. structurally similar to the compression members 44.

The pressure members 48 are advantageously located axially on a distal third of the second plurality of the lamellae 67.

Each of the pressure members 48 advantageously consist of a material having a coefficient of thermal expansion greater than or equal to the coefficient of thermal expansion of the second plurality of lamellae 67, and greater than or equal to the coefficient of thermal expansion of the ring 28.

The operation of the electrical connector 10 follows from the structure thereof and will now be briefly described.

In the non-inserted configuration, there is no direct electrical contact between the first contact 12 and the second contact 14. The contacts are disconnected from each other.

When the first contact 12 and the second contact 14 are moved by axial translation from the non-inserted configuration to the inserted configuration, the insertion part 16 of the first contact enters the housing 18. The first plurality of lamellae 40 are pressed against the radially outer surface 58 of the insertion part 16 over a length L5. Advantageously, the compression member or members 44 press radially on the lamellae 40 towards the insertion part 16 and improve the electrical contact between the lamellae 40 and the insertion part 16, by increasing the pressure and the contact surface therebetween and/or making the pressure uniform along the axis of insertion D.

Similarly, the first additional part 22 and the second additional part 42 are pressed radially against each other and are in electrical contact with each other over a length L6, e.g. substantially equal to the length L5. Advantageously, the pressure member or members 48 press on the second plurality of lamellae 67 towards the ring 28 and improve the electrical contact between the lamellae 67 and the ring 28, by increasing the pressure and the contact surface therebetween and/or making the pressure uniform along the axis of insertion D.

Advantageously, the first additional part 22 is thus in electrical contact with the first body 20. Thereby, the first additional part 22 and the insertable part 16 are in electrical contact with each other via the first body 20.

The second additional part 42 is thus in electrical contact with the second body 38. The first plurality of lamellae 40 and the second additional part 42 are in mechanical contact with each other via the second body 38.

Due to the aforementioned features, in particular the first additional part 22 and the second additional part 42 in electrical contact respectively with the first body 20 and the second body 38, the electrical connector 10 has a larger contact surface than a connector not having such additional parts. For example, the contact surface can be approximately doubled if the lengths L5 and L6 are substantially equal.

For the same desired contact surface, the electrical connector 10 is thus shorter and occupies a smaller volume. Furthermore, the electrical connector requires a reasonable insertion force and has a low electrical resistance, due to the first plurality of lamellae 40 in contact with the insertion part 16, and to the second plurality of lamellae 67 in contact with the ring 28.

Advantageously, the compression members 44 and the pressure members 48 reduce the electrical contact resistance, all other things being equal.

The two optional bases 54, 56 facilitate the manufacture of the electrical connector 10, by making it possible to directly mount the first plurality of lamellae 40 and the second plurality of lamellae 67 onto the main part 52 of the second body 38.

With reference FIGS. 3 and 4, an electrical connector 100 which is a variant of the electrical connector, is described. The electrical connector 100 is similar to the electrical connector 100 shown in FIGS. 1 and 2. Similar elements bear the same numerical references and will not be described again. Hereinafter, only the differences will described in detail.

In the electrical connector 100, the first additional part 22 comprises the second plurality of lamellae 67, the second additional part 42 forming the ring 28. The optional pressure members 48 are a part of the first contact 12.

The first body 20 advantageously comprises a main part 102 and a base 104 received in and attached to the main part 102 on the proximal side of the base, and with which the insertion part 16 is integral, which makes it possible to directly mount the insertion part 16 onto the main part 102 of the first body 20.

The electrical connector 100 works in a similar manner to the electrical connector 10 and has the same advantages.

According to variants (not shown) of the electrical connectors 10 and 100, the second plurality of lamellae 67 surrounds, in the inserted configuration, the ring 28 about the axis of insertion D, the second plurality of lamellae being pressed radially against the radially outer surface 36 of the ring 28.

The invention claimed is:

1. An electrical connector comprising a first contact and a second contact movable between an non-inserted configuration, wherein the first contact is at a distance from the second contact, and an inserted configuration, wherein an electrically conductive insertable part of the first contact is inserted along an axis of insertion into a housing defined by the second contact, the first contact comprising a first electrically conductive body from which the insertable part protrudes axially, the second contact comprising a second electrically conductive body, and a first plurality of flexible strips protruding axially from the second body and angularly distributed around the insertable part in the inserted configuration, the first plurality of flexible strips being electrically conductive and radially flexible, the second body and the first plurality of flexible strips defining the housing, wherein:

the first contact further comprises an electrically conductive first additional part protruding axially from the first body and surrounding the insertable part about the axis of insertion, the second contact further comprises an electrically conductive second additional part protruding axially from the second body and surrounding the first plurality of lamellae about the axis of insertion, the first additional part and the second additional part are suitable for radially pressing against each other and for being in electrical contact with each other in the inserted configuration, and for being at a distance from each other in the non-inserted configuration, and the first additional part comprises one amongst a ring and a second plurality of flexible strips which are distributed angularly about the axis of insertion and are radially flexible, the second additional part comprising the other amongst the ring and the second plurality of flexible strips;

wherein the electrical connector further comprises at least one annular pressure member arranged on faces of the second plurality of flexible strips, the pressure member being suitable for exerting, in the inserted configuration, a radial pressure on the second plurality of flexible strips toward the ring; and wherein the electrical connector further comprises a plurality of annular pressure members axially shifted from each other.

2. The electrical connector according to claim 1, wherein the ring surrounds the second plurality of flexible strips about the axis of insertion in the inserted configuration, the second plurality of flexible strips being radially pressed against a radially inner surface of the ring.

3. The electrical connector according to claim 1, wherein the at least one annular pressure member comprises a "C"-shaped curved strip.

4. The electrical connector according to claim 1, further comprising at least one annular compression member arranged on radially outer faces of the first plurality of flexible strips, the compression member being suitable for exerting, in the inserted configuration, a centripetal radial pressure on the first plurality of flexible strips.

5. The electrical connector according to claim 1, wherein the ring defines:

a cylindrical or frustoconical radially inner surface flaring on the distal side along the axis of insertion, or a cylindrical or frustoconical radially outer surface narrowing on the distal side along the axis of insertion.

6. The electrical connector according to claim 1, wherein the first body comprises a main part, and a base axially received in and attached to said main part, the insertion part being integral with said base.

7. The electrical connector according to claim 1, wherein the second body comprises a main part, and a base axially received in and attached to said main part, the first plurality of flexible strips being integral with said base.

8. The electrical connector according to claim 1, wherein the second plurality of flexible strips is integral with a base defined by the first body or the second body, said base being axially received in and attached to a main part of the first body or of the second body.

9. The electrical connector according to claim 1, wherein the connector is a power connector suitable for transmitting a current with an intensity greater than or equal to 1 ampere.

10. An electrical connector comprising a first contact and a second contact movable between an non-inserted configuration, wherein the first contact is at a distance from the second contact, and an inserted configuration, wherein an electrically conductive insertable part of the first contact is inserted along an axis of insertion into a housing defined by the second contact, the first contact comprising a first electrically conductive body from which the insertable part protrudes axially, the second contact comprising a second electrically conductive body, and a first plurality of flexible strips protruding axially from the second body and angularly distributed around the insertable part in the inserted configuration, the first plurality of flexible strips being electrically conductive and radially flexible, the second body and the first plurality of flexible strips defining the housing, wherein the first contact further comprises an electrically conductive first additional part protruding axially from the first body and surrounding the insertable part about the axis of insertion;

wherein the second contact further comprises an electrically conductive second additional part protruding axially from the second body and surrounding the first plurality of flexible strips about the axis of insertion, the first additional part and the second additional part are suitable for radially pressing against each other and for being in electrical contact with each other in the inserted configuration, and for being at a distance from each other in the non-inserted configuration;

wherein the first additional part comprises one amongst a ring and a second plurality of flexible strips which are distributed angularly about the axis of insertion and are radially flexible, the second additional part comprising the other amongst the ring and the second plurality of flexible strips;

wherein the electrical connector further comprises at least one annular pressure member arranged on faces of the second plurality of flexible strips, the pressure member being suitable for exerting, in the inserted configuration, a radial pressure on the second plurality of flexible strips toward the ring; and wherein the at least one annular pressure member comprises a material having a coefficient of thermal expansion greater than or equal to a coefficient of thermal expansion of the second plurality of flexible strips, and greater than or equal to a coefficient of thermal expansion of the ring.

11. The electrical connector according to claim 10, wherein the coefficient of thermal expansion of said material is greater than the coefficient of thermal expansion of the second plurality of flexible strips, and greater than the coefficient of thermal expansion of the ring.

* * * * *